United States Patent [19]

Vallee et al.

[11] Patent Number: 4,645,565

[45] Date of Patent: Feb. 24, 1987

[54] MATERIAL IN SHEET FORM, CONVERTIBLE INTO A FINISHED PRODUCT BY MOULDING-STAMPING OR HEAT-SHAPING, COMPRISING REINFORCING FIBERS AND A THERMOPLASTICS RESIN IN POWER FORM, AND PROCESS FOR PREPARING SAID MATERIAL

[75] Inventors: Antoine Vallee, Charavines; Henri Cortinchi, St. Michel sur Orge, both of France

[73] Assignee: Arjomari-Prioux, Paris, France

[21] Appl. No.: 767,673

[22] Filed: Aug. 21, 1985

Related U.S. Application Data

[63] Continuation of Ser. No. 449,871, Dec. 15, 1982, abandoned, which is a continuation of Ser. No. 258,417, Apr. 28, 1981, abandoned.

[30] Foreign Application Priority Data

Apr. 30, 1980 [FR] France ................................ 80 09858

[51] Int. Cl.$^4$ ................................................ D21H 1/02
[52] U.S. Cl. .................................... 162/123; 162/145; 162/146; 162/158; 162/168.1; 162/169; 162/206; 162/224; 162/225
[58] Field of Search ..................... 162/145, 146, 157.5, 162/168.1, 169, 156, 117, 231, 123, 206, 207, 158, 224, 225; 428/513

[56] References Cited

U.S. PATENT DOCUMENTS

| | | |
|---|---|---|
| 2,962,414 | 11/1960 | Arledter . |
| 3,511,750 | 5/1970 | Hider .................................... 428/513 |
| 3,573,158 | 3/1971 | Pall et al. . |
| 3,674,621 | 7/1972 | Miyamoto et al. . |
| 4,084,949 | 4/1978 | Biggins ................................ 162/146 |
| 4,426,470 | 1/1984 | Wessling et al. ..................... 162/146 |
| 4,481,075 | 11/1984 | Dailly et al. ......................... 162/145 |
| 4,487,657 | 12/1984 | Gomez ................................. 162/158 |

FOREIGN PATENT DOCUMENTS

| | | |
|---|---|---|
| 45-8164 | 3/1970 | Japan . |
| 52-53006 | 4/1977 | Japan ................................. 162/146 |
| 2028887 | 3/1980 | United Kingdom . |

*Primary Examiner*—Peter Chin
*Attorney, Agent, or Firm*—Brumbaugh, Graves, Donohue & Raymond

[57] ABSTRACT

The present invention relates to a material in sheet form, used in a process of moulding-stamping or heat-forming involving melting of the thermoplastics resin contained in said material, said material in sheet form being prepared by the papermaking technique and comprising from 20 to 95% of reinforcing fibres and from 80 to 5% of thermoplastics resin in powder form forming the basic mixture and, with respect to this mixture, from 5 to 25% of a polyolefin pulp, from 5 to 30% of a binding agent and from 0.2 to 10% of at least one flocculating agent. The invention also relates to the process for preparing said material in sheet form.

10 Claims, No Drawings

MATERIAL IN SHEET FORM, CONVERTIBLE INTO A FINISHED PRODUCT BY MOULDING-STAMPING OR HEAT-SHAPING, COMPRISING REINFORCING FIBERS AND A THERMOPLASTICS RESIN IN POWER FORM, AND PROCESS FOR PREPARING SAID MATERIAL

This application is a continuation of application Ser. No. 449,871, filed on Dec. 15, 1982, which is a continuation of application Ser. No. 258,417 filed on Apr. 28, 1981, both now abandoned.

The present invention relates to a material in sheet form comprising reinforcing fibres and a thermoplastics resin in powder form, said material in sheet form being convertible, particularly by moulding-stamping or heat-shaping, into a finished product. It also relates to a process for manufacturing this material in sheet form.

Finished products (pieces and various objects) are known which are constituted by a thermoplastics resin reinforced with the aid of reinforcing fibres. One of the difficulties in producing products of this type is known to consist in preparing a homogeneous mixture of plastics material and of reinforcing fibres and in suitably converting this mixture, by conventional thermoplastics material conversion techniques, without altering the reinforcing properties of the fibres.

It is an object of the invention to solve such a difficulty by proposing a novel material in supple sheet form, comprising reinforcing fibres and a thermoplastics resin in powder form, said sheets being convertible, by moulding-stamping or heat-shaping, after possibly being stacked with other sheets, into a finished article having the physical properties of a reinforced thermoplastic.

This material in sheet form is obtained by means of a conventional papermaking technique, i.e. a technique consisting in suitably flocculating an aqueous suspension containing the various ingredients of the mixture, then in dewatering said suspension so as to produce a sheet which is subjected to suitable drying.

It is known that papermaking techniques, such as described briefly hereinabove, are essentially applicable with cellulosic fibres whose structure facilitates coherence of the sheet obtained at the various stages of its manufacture. It is also known that the reinforcing fibres, such as those used in the present Application, do not have the same structure and therefore do not have the same properties as cellulosic fibres and cannot easily be used in the absence of cellulosic fibres in the processes carrying out said papermaking techniques. Finally, it is known that, in numerous applications, the presence of cellulosic fibres in the articles is undesirable. It has been found that materials in sheet form comprisng reinforcing fibres and a thermoplastics resin in powder form, could easily be prepared, according to papermaking techniques, using polyolefin pulps as indicated hereinafter.

Reinforcing fibres which may be used are mineral fibres (such as glass, carbon, ceramic, boron fibres), metallic fibres or certain organic synthetic fibres with high melting point (aromatic polyamides, polyesters and the like). The fibres used may have lengths of up to about 30 mm, but it is preferable to use shorter fibres, of length less than 15 mm. Several types of fibres may be used in the same material.

Glass fibres are the preferred reinforcing material.

The thermoplastics resin used may be a polyolefin (polyethylene, polypropylene), polyvinylchloride, polystyrene, a polyamide or a polyester.

In the preparation of the finished articles from the materials in sheet form according to the invention, this thermoplastics resin will be taken to sufficient temperature to be plasticised or melted and shaped, for example by moulding-stamping or heat-shaping; i.e. those thermoplastics resins may be chosen which have structures (crystallinity for example) or basic properties (melting index) which are the most appropriate; likewise these resins may be used in their best adapted form (copolymers for high impact polystyrenes or containing elastomers for improving their impact strength) and they may possibly include additives (such as plasticizers for example); mixtures of these thermoplastics resins may also be used for making known plastic alloys.

The thermoplastics resin will be used in the form of powder of which the particles have dimensions smaller than 500 microns.

The choice of the reinforcing fibres and of the thermoplastics resin will be such that there is at least about 50° C. between the softening (or melting) points of these two products. In fact, during conversion of said sheet (or stack of sheets), which will involve melting the thermoplastics resin, the fibres must maintain their structure and consequently their reinforcing power. The reinforcing fibres and the plastics material constituting the "basic mixture" of the product according to the invention, said basic mixture must comprise from 20 to 95% by weight of reinforcing fibres and form 80 to 5% by weight of thermoplastics resin. Insufficient quantities of reinforcing fibres (for example less than 20% by weight) would not enable final products to be obtained, after heat-treatment, having sufficiently improved properties over those of corresponding thermoplastics materials not containing fibres. Insufficient quantities of thermoplastics resin (for example less than 5% by weight) do not allow a suitable coating of the fibres nor a homogeneous distribution of said fibres within this material.

The materials in sheet form according to the invention will, in addition, comprise from 5 to 25% by weight, with respect to the basic mixture, of "polyolefin pulp". By definition, "polyolefin pulps" are fibrils of polyolefin which may comprise a mineral filler and obtained either by refining fibres or from solutions of polymer by precipitation in the presence of scission forces or by expansion through an orifice with controlled pressure drop. These fibrils have a known structure and present, in particular, a high specific surface (greater than 1 square meter per gram) which facilitates retention of the powders. The polyolefin pulps are marketed in the form of felted sheets containing a certain proportion of water; the weight is here considered for dry fibres. Such polyolefin pulps are described for example in U.S. Pat. Nos. 3,743,272, 3,987,139 and 4,007,247.

When the materials comprise an insufficient quantity of these "polyolefin pulps" (or less than 5% by weight with respect to the basic mixture), the sheet of paper which may be obtained by carrying out the papermaking techniques no longer presents the mechanical strength necessary to be stretched on the papermaking machine; moreover, the retention of the thermoplastics resin, which is added in the form of powder, is insufficient.

When the finished products are made from the materials in sheet form according to the invention, these "polyolefin pulps" will undergo melting, like the thermoplastics resin; these pulps will therefore not be found, in the form of fibrils, in the finished products and the polyolefin pulps will mix intimately with the thermoplastics material used.

The sheets according to the invention will also comprise a binding agent used at a rate of 5 to 30% by weight with respect to the the weight of the basic mixture.

This binding agent ensures the bonding of the constituents of the thermoplastics sheet to one another and may possibly reinforce the physical properties of the sheet. Among suitable binding agents, those of Table I hereinbelow may be particularly mentioned. The preferred binding agents are latexes (acrylics, syrenebutadiene).

This binding agent acts, by flocculation, by creating a bond between the various elements of the mixture as soon as a flocculating agent is added to the mixture. Moreover, with a view to reinforcing the mechanical strength of the moist sheet, up to 10% by weight, with respect to the basic mixture, of polyvinyl alcohol fibres may be used; these fibres will be chosen so that, sparingly soluble in water, cold, they will be solubilised at a temperature lower than 100° C. when the still moist sheet will be heated. This solubilisation of the polyvinyl alcohol fibres will produce an additional binding agent which may improve the properties of the sheet dried during the subsequent handlings.

The sheets according to the invention will also comprise at least one flocculating agent (0.2 to 10 parts by weight for 100 parts by weight of the basic mixture).

Among suitable flocculants, special mention may be made of metal salts such as in particular the salts of aluminium, iron(II), iron(III), zinc and chromium; halides, sulfates and phosphates and the other substances indicated in Table II hereinbelow. The preferred flocculating agent according to the invention is aluminium polychloride which is a substance also known under the name of aluminium hydroxychloride, which has for general formula $(OH)_y Al_x Cl_{x \cdot y \cdot x}$ and which is marketed in particular by the firm Péchiney Ugine Kuhlmann under the trademark "WAC".

The sheets according to the invention may also comprise, if this appears desirable, various additives such as antioxidants, pigments, etc .... They may also comprise various fillers, particularly mineral or organic fillers which enable, as known, certain properties of the finished products to be modified; up to 50% by weight, with respect to the basic mixture, of such mineral fillers may be used.

Dispersants are also used to promote dispersion of the fibres in the water; among the dispersants which may be used, the most interesting products are the cationic dispersants which have the advantage of performing, to a certain extent, the role of a first flocculating agent; the products of condensation of fatty acids may be mentioned as particularly advantageous cationic dispersant.

The process for making the sheets according to the invention is characterised in that the various ingredients constituting the sheets are mixed and at least a part of the flocculating agent is added to said mixture.

This addition of flocculating agent as ultimate step of the process is important in order to effect a suitable distribution of the various constituents in the final product.

This flocculating agent may be introduced into the mixture in one fraction or in two fractions; in the latter case, the first fraction of the flocculating agent is added to the mixture before the binding agent is added to this mixture.

When the flocculating agent is introduced in two fractions, the first fraction of the flocculating agent, which is introduced before the binding agent, and the binding agent ensure a first agglomeration of the constituents. The second fraction of the flocculating agent has for its object to reinforce the cohesion of the constituents and thus improve the retention on the papermaking machine and the strength of the flocks. Of course, either the same flocculating agent may be used before and after the binding agent, or different flocculating agents may be used, or finally mixtures of flocculating agents.

To make the mixture, a relatively concentrated mixture will firstly be made in water, successively adding the dispersant agent then the reinforcing fibres, then the polyolefin pulp, then the thermoplastics resin in powder form, then possibly part of the flocculating agent, then the binding agent, then the rest of the flocculating agent.

This relatively concentrated mixture will then be diluted until an aqueous suspension is obtained containing about 0.01 to 5% of solid products.

When glass fibres are used as reinforcing fibres, the dilution provided hereinabove sometimes causes a reagglomeration of the fibres; to avoid this phenomenon, the medium may advantageously be acidified (for example by adding sulfuric acid) until a pH of the order of 2 to 4 is obtained.

When the suitable mixture has been obtained, this mixture is treated on the known paper-making machines (dewatering, drying, etc .... ).

The invention thus makes it possible to prepare dry, supple, self-supporting, easy-to-handle sheets, having a thickness which may vary between about 0.5 and about 5 mm at the most. These sheets are specially used for the preparation of various articles; this preparation will be effected by heating (heating sufficient to cause melting of the thermoplastics resin and of the polyolefin pulp contained in the sheets) and shaping by moulding, stamping or heat-shaping of the sheets (single sheet or stack of sheets) obtained. The preferred process consists in an operation for moulding-stamping a stack of sheets according to the invention.

The following non-limiting examples illustrate the invention.

EXAMPLE 1

In a liter of water containing 0.2% of a cationic dispersant based on fatty acid (Cartaspers DS1 of Sandoz) which also performs the role of flocculating agent for the powder, 40 g of glass fibres having an average length of 4.5 mm, are added with strong stirring. 10 g of synthetic polyethylene pulp are then introduced with moderate stirring. After suitable dispersion, 60 g of polypropylene powder, of mean particle size 50 are added. An anti-foaming agent is added, then 10 g of binding agent (dry) which is a polymer of acrylic type, reference L1 in Table I. Still with stirring, 2 g, dry, of alumina sulfate are added as the second flocculating agent. After dilution until the suspension contains about 5 g of solids per liter and addition of sulfuric acid for a pH of 2.5, the mixture is then admitted on a wire screen, dewatered then dried according to the conventional papermaking technique; the only precaution to be taken is to use weak pulling forces on the sheet in the course of drying. A sheet of 500 g/m² is thus obtained which comprises sufficient cohesion to be handled, stored, transported and in which the various components of the formulation have been perfectly retained.

To make a final industrial product from this sheet, about ten of such sheets may for example be superposed and, after having effected preheating up to a temperature of the order of 180° to 210° C., the assembly may be moulded under pressures of 40 to 100 kg/cm² for a cycle of less than 30 seconds.

EXAMPLE 2

This example differs from the preceding one in that the glass fibres have a length of 12 mm, and, for this reason, are dispersed in a dilution taken to 10 g/l, and 0.5% of WAC is added to the mixture just before the formation of the sheet so as to maintain a high degree of retention.

EXAMPLE 3

This example differs from Example 1 in that the glass fibres and the polypropylene powder are mixed in the respective quantities of 20 g and 80 g per liter of water, and in that 0.5% of WAC is added in the mixture just before the formation of the sheet so as to maintain a high degree of retention.

EXAMPLE 4

In 150 liters of water containing 0.04% of a cationic dispersant agent based on fatty acid (Cartaspers DS1 of Sandoz) which also performs the role of flocculating agent for the powder, 600 g of water-sensitive oiling glass fibres having an average length of 6.5 mm and a diameter of 11 microns are added with energetic stirring. 300 g of synthetic polyethylene pulp in 50 liters of water are then introduced with moderate stirring. After suitable dispersion, 900 g of powder of a polypropylene of fluidity index 3 and a mean particle size of 80 microns, are added. An antifoaming agent is added, then 300 g (dry) of binding agent which is a polymer of acrylic type referenced L1 in Table I. Still with stirring, 30 g (dry) of alumina sulfate as second flocculating agent are added. After dilution until the suspension comprises about 5 g of solid matter per liter and addition of sulfuric acid for a pH of 2.5, the mixture is then admitted on a papermaking machine with addition, just before the formation of the sheet, of 0.5% of WAC.

A supple sheet of 500 g/m² is thus obtained which comprises a sufficient cohesion to be handled, stored, transported and in which the various components of the formulation have been perfectly retained. The sheet has a thickness of about 1.6 mm.

Between other applications, the plastics technician can convert a stack of a plurality of blanks cut out from such a sheet, by moulding, stamping towards 200° C., after prior preheating, under pressures of 40 to 100 kg/cm² for a cycle of less than 30 secs., into a complex thermoplastics piece reinforced with 30% of glass fibres having at 20° C. a modulus of flexion of 2500 megapascals (MPa), a tensile strength of 50 megapascals as well as a very good impact strength.

EXAMPLE 5

This Example differs from Example 4 in that the glass fibres have a length of 13 mm and the sheet thus obtained makes it possible to obtain glass fibre reinforced polyolefin pieces with a modulus of flexion of 3400 MPa and tensile strength of 80 MPa at 20° C.

EXAMPLE 6

This Example differs from Example 4 in that the glass fibres and the thermoplastics powder are mixed in respective quantities of 825 g and 675 g, that the synthetic pulp is polypropylene and in that, finally, powder and pulp are of polypropylene with a fluidity index of 5. The polypropylene reinforced with 40% of glass fibres, moulded by stamping from such a material, has a modulus of flexion of 3700 MPa and a tensile strength of 60 MPa.

EXAMPLE 7

This Example differs from Example 4 in that the 6.5 mm glass fibres have a plastic oiling and 10% by weight, with respect to the basic mixture, of polyvinyl alcohol fibres of length 4 mm and whose temperature of solubilisation in water is 60° C., is used. The sheet of 500 g/m², which is perfectly isotropic, has a tensile strength slightly greater than 2 decanewtons/15 mm.

EXAMPLE 8

This Example is different from Example 7 in that the glass fibre is that of Example 4 and in that the polypropylene powder has a coarser particle size, centred on 250 microns, the material in sheet form presenting the same qualities for handling and gives, after thermoplastic conversion, a material of which the modulus of flexion is 4000 MPa and the tensile strength is 61 MPa, at 20° C.

EXAMPLE 9

The formulation differs from that of Example 7 in that the glass fibres are crushed fibres.

EXAMPLE 10

The composition differs from that of Example 7 in that 40 parts by weight, with respect to the basic mixture, of a talc with a mean particle size of 0.85 micron, are added.

EXAMPLE 11

This Example differs from Example 7 in that the glass fibres and the polypropylene powder are mixed in the respective quantities of 300 g and 1200 g to give, after heat-treatment, a product reinforced with only 15% of glass fibres.

EXAMPLE 12

This Example differs from Example 4 in that the quantities of glass fibres and of polypropylene powder are respectively 1425 g and 75 g and that the material in sheet form obtained is convertible by heat-shaping into elements reinforced with 70% of glass fibres.

EXAMPLE 13

This Example differs from Example 4 in that, instead of a polypropylene powder;
either a polyamide 12 powder of particle size less than 25 microns,
or a polyvinylchloride powder of particle size less than 60 microns,
or a polystyrene powder of particle size less than 100 microns,
is used.

EXAMPLE 14

This Example differs from Example 4 in that the polyolefin pulp is polypropylene with fluidity index 5, in that 5%, with respect to the basic mixture, of polyvinyl alcohol fibres of length 4 mm and whose temperature of solubilisation in water is 60° C., are used, but, especially, in that the polypropylene powder is replaced by a polybutyleneterephthalate powder.

EXAMPLE 15

This Example differs from the preceding Examples in that the reinforcing fibres are no longer of glass but of ceramic with a mean diameter of 3 microns and are dispersed at pH 2.5 for 55 parts by weight; the rest of the basic mixture is a polypropylene powder; all the other components are then introduced at neutral pH and the whole is dewatered on a wire screen, dried in the same proportions and conditions as in Example 4.

EXAMPLE 16

In this Example, the basic mixture is constituted for 45 parts by weight of a reinforcement of poly-para-phenylenediamine-terephthalamide 2 mm, the rest being a powder of polybuteneterephthalate. The pulp is polypropylene. This pulp and the binding agent L1 are added, each at a rate of 5% of this mixture. A sheet has thus been produced which is very easily handled and hot-stamped.

EXAMPLE 17

Example 4 is repeated by replacing the glass fibres by 6 mm fibres of poly-para-phenylenediamine-terephthalamide and the thermoplastics resin by a powder of polyamide 12 with a particle size less than 25 microns.

EXAMPLE 18

Example 4 is repeated, using 5 mm carbon fibres instead of the glass fibres; moreover, 25 parts by weight of binding agent L1 are used, with respect to the basic mixture.

TABLE I

| | Examples of binding agents |
|---|---|
| L1 | Polymer containing 87 to 90 parts by weight of ethyl acrylate unit, 1 to 8 parts by weight of acrylonitrile units, 1 to 6 parts by weight of N—methylolacrylamide unit and 1 to 6 parts by weight of acrylic acid unit. Aqueous dispersion at 40-55% |
| L2 | Polymer containing 60 to 75 parts by weight of ethyl acrylate unit, 5 to 15 parts by weight of acrylonitrile unit, 10 to 20 parts by weight of butyl acrylate unit, 1 to 6 parts by weight of N—methylolacrylamide unit. Aqueous dispersion at 40-55%. |
| L3 | Polymer containing 60 to 65 parts by weight of butadiene unit, 35 to 40 parts by weight of acrylonitrile unit and 1 to 7 parts by weight of methacrylic acid unit. Aqueous dispersion at 40-55% |
| L4 | Polymer containing 38 to 50 parts by weight of styrene unit, 47 to 59 parts by weight of butadiene unit and 1 to 6 parts by weight of methylacrylamide unit. Aqueous dispersion at 40-55% |
| L5 | Polymer containing 53 to 65 parts by weight of styrene unit, 32 to 44 parts by weight of butadiene unit and 1 to 6 parts by weight of methylacrylamide unit. Aqueous dispersion at 40-55% |

TABLE II

| Flocculating agents - N.B. The solutions are aqueous solutions | |
|---|---|
| Reference | Type of flocculating agents |
| P1 | Aluminium sulfate |
| P2 | Aluminium polychloride (aluminium hydroxychloride |
| P3 | Sodium and calcium aluminate |
| P4 | Blend of polyacrylic acid and polyacrylamide in 5-30% (weight/volume) solution |
| P5 | Polyethyleneimine in 2-50% (weight/volume) solution |
| P6 | Copolymer of acrylamide and of β-methacrylyloxyethyltrimethylammonium methylsulfate |
| P7 | Polyamine-epichlorohydrine and diamine-propylmethylamine resin in 2-50% solution |
| P8 | Polyamide-epichlorohydrine resin made from epichlorohydrine, adipic acid, caprolactame, diethylenetriamine and/or ethylenediamine, in 2-50% solution |
| P9 | Polyamide-polyamine-epichlorohydrine resin made from epichlorohydrine, dimethyl ester, adipic acid and diethylenetriamine, in 2-50% solution |
| P10 | Polyamide-epichlorohydrine resin made from epichlorohydrine, diethylenetriamine, adipic acid and ethyleneimine |
| P11 | Polyamide-epichlorohydrine made from adipic acid, diethylenetriamine and a blend of epichlorohydrine and dimethylamine in 2-50% solution |
| P12 | Cationic polyamide-polyamine resin made from triethylenetriamine |
| P13 | Condensation products of aromatic sulfonic acids with formaldehyde |
| P14 | Aluminium acetate |
| P15 | Aluminium formate |
| P16 | Blend of acetate, sulfate and formate of aluminium |
| P17 | Aluminium chloride (AlCl$_3$) |
| P18 | Cationic starch |

What is claimed is:

1. A process for preparing a homogeneous reinforced thermoplastic sheet using papermaking techniques which comprises the steps of:
    a. preparing a basic homogeneous mixture consisting essentially of from about 80 to 40% by weight of the basic mixture of a powdered thermoplastic resin having a particle size of up to about 500 microns and about 20 to 60% by weight fibers of the same average length selected from the group consisting of mineral fibers, metallic fibers and synthetic organic fibers having a melting point at least about 50° C. higher than the melting point of the thermoplastic resin;
    b. adding about 5 to 25% by weight of the basic mixture of a polyolefin pulp having a specific surface area greater than about 1 m$^2$/g; about 5 to 30% by weight of the basic mixture of a binding agent selected from the group consisting of latexes and polyvinyl alcohol fibers having a solubilizing temperature lower than 100° C. and about 0.2 to 10% by weight of the basic mixture of at least one flocculating agent;
    c. allowing the homogeneous mixture to flocculate;
    d. admitting the homogeneous mixture onto a wire screen as a single homogeneous layer;
    e. dewatering the homogeneous mixture;
    f. drying the resulting self-supporting homogeneous sheet to form a moldable reinforced thermoplastic sheet having a homogeneous composition.

2. A process for preparing a homogeneous heat-pressure product using papermaking techniques which comprises the steps of:
    a. preparing a basic homogeneous mixture consisting essentially of from about 80 to 40% by weight of the basic mixture of a powdered thermoplastic resin having a particle size of up to about 500 microns and about 20 to 60% by weight fibers of the same average length selected from the group consisting of mineral fibers, metallic fibers and synthetic organic fibers having a melting point at least about 50° C. higher than the melting point of the thermoplastic resin;

b. adding about 5 to 25% by weight of the basic mixture of a polyolefin pulp having a specific surface area greater than about 1 m²/g; about 5 to 30% by weight of the basic mixture of a binding agent selected from the group consisting of latexes and polyvinyl alcohol fibers having a solubilizing temperature lower than 100°·C. and about 0.2 to 10% by weight of the basic mixture of at least one flocculating agent;

c. allowing the homogeneous mixture to flocculate;

d. admitting the homogeneous mixture onto a wire screen as a single homogeneous layer;

e. dewatering the homogeneous mixture;

f. drying the resulting self-supporting homogeneous sheet to form a moldable reinforced thermoplastic sheet having a homogeneous composition;

g. heating a stack containing one or more thermoplastic sheets to a temperature sufficient to cause melting of the thermoplastic resin and the polyolefin pulp.

3. A process for preparing a homogeneous heat-pressure molded product using papermaking techniques which comprises the steps of:

a. preparing a basic homogeneous mixture consisting essentially of from about 80 to 40% by weight of the basic mixture of a powdered thermoplastic resin having a particular size of up to about 500 microns and about 20 to 60% by weight fibers of the same average length selected from the group consisting of mineral fibers, metallic fibers and synthetic organic fibers having a melting point at least about 50° C. higher than the melting point of the thermoplastic resin;

b. adding about 5 to 25% by weight of the basic mixture of a polyolefin pulp having a specific surface area greater than about 1 m²/g; about 5 to 30% by weight of the basic mixture of a binding agent selected from the group consisting of latexes and polyvinyl alcohol fibers having a solubilizing temperature lower than 100° C. and about 0.2 to 10% by weight of the basic mixture of at least one flocculating agent;

c. allowing the homogeneous mixture to flocculate;

d. admitting the homogeneous mixture onto a wire screen as a single homogeneous layer;

e. dewatering the homogeneous mixture;

f. drying the resulting self-supporting homogeneous sheet to form a moldable reinforced thermoplastic sheet having a homogeneous composition;

g. heating a stack containing one or more thermoplastic sheets to a temperature sufficient to cause melting of the thermoplastic resin and a polyolefin pulp;

h. molding the heated stack under pressure to achieve a homogeneous molded product.

4. A process for preparing a homogeneous reinforced thermoplastic sheet using papermaking techniques which comprises the steps of:

a. preparing a basic homogeneous mixture consisting essentially of from about 80 to 5% by weight of the basic mixture of a powdered thermoplastic resin having a particular size of up to about 500 microns and about 20 to 95% by weight fibers of the same average length selected from the group consisting of mineral fibers, metallic fibers and synthetic organic fibers having a melting point at least about 50° C. higher than the melting point of the thermoplastic resin;

b. adding about 5 to 25% by weight of the basic mixture of a polyolefin pulp having a specific surface area greater than about 1 m²/g; about 5 to 30% by weight of the basic mixture of a binding agent selected from the group consisting of latexes and polyvinyl alcohol fibers having a solubilizing temperature lower than 100° C. and about 0.2 to 10% by weight of the basic mixture of at least one flocculating agent;

c. allowing the homogeneous mixture to flocculate;

d. admitting the homogeneous mixture onto a wire screen as a single homogeneous layer;

e. dewatering the homogeneous mixture;

f. drying the resulting self-supporting homogeneous sheet to form a moldable reinforced thermoplastic sheet having a homogeneous composition.

5. A homogeneous reinforced thermoplastic sheet prepared using papermaking techniques which comprises the steps of:

a. preparing a basic homogeneous mixture consisting essentially of from about 80 to 40% by weight of the basic mixture of a powdered thermoplastic resin having a particle size of up to about 500 microns and about 20 to 60% by weight fibers of the same average length selected from the group consisting of mineral fibers, metallic fibers and synthetic organic fibers having a melting point at least about 50° C. higher than the melting point of the thermoplastic resin;

b. adding about 5 to 25% by weight of the basic mixture of a polyolefin pulp having a specific surface area greater than about 1 m²/g; about 5 to 30% by weight of the basic mixture of a binding agent selected from the group consisting of latexes and polyvinyl alcohol fibers having a solubilizing temperature lower than 100° C. and about 0.2 to 10% by weight of the basic mixture of at least one flocculating agent;

c. allowing the homogeneous mixture to flocculate;

d. admitting the homogeneous mixture onto a wire screen as a single homogeneous layer;

e. dewatering the homogeneous mixture;

f. drying the resulting self-supporting homogeneous sheet to form a moldable reinforced thermoplastic sheet having a homogeneous composition.

6. The process as described in claim 1, wherein the molding is accomplished by a method selected from the group consisting of stamp molding or heat stamping.

7. The process as described in claim 1, 2 or 3, wherein the aqueous mixture is prepared by adding successively in order a dispersing agent, reinforcing fibers, polyolefin pulp, thermoplastic resin, a portion of the flocculating agent, binding agent and the remaining flocculating agent.

8. The process as described in claim 1, 2 or 3, wherein the aqueous mixture in step a is allowed to flocculate in a concentrate form and is then diluted with water so as to obtain aqueous suspension containing about 0.01 to 5% by weight of solids.

9. The process as described in claim 8, wherein the mixture is acidified during dilution to about pH 2 to pH 4.

10. The process as described in claim 9, wherein sulfuric acid is used to acidify the mixture.

* * * * *